(12) United States Patent
Bates, Jr. et al.

(10) Patent No.: US 6,876,917 B1
(45) Date of Patent: Apr. 5, 2005

(54) EXHAUST PIPE HEATER

(75) Inventors: Richard H. Bates, Jr., Badger, MN (US); Brian R. Gillingham, Badger, MN (US)

(73) Assignee: Polaris Industries Inc., Medina, MN (US)

(*) Notice: Subject to any disclaimer, the term of this patent is extended or adjusted under 35 U.S.C. 154(b) by 210 days.

(21) Appl. No.: 10/327,763

(22) Filed: Dec. 23, 2002

Related U.S. Application Data

(60) Provisional application No. 60/417,976, filed on Oct. 11, 2002.

(51) Int. Cl.⁷ .................................................. F02P 5/15
(52) U.S. Cl. ....................... 701/108; 701/109; 701/115; 60/276
(58) Field of Search ................................. 701/108, 102, 701/115, 109; 123/406.44, 406.55, 406.13; 60/276, 285

(56) References Cited

U.S. PATENT DOCUMENTS

| | | |
|---|---|---|
| 3,799,134 A | 3/1974 | Griese ..................... 123/119 A |
| 3,813,877 A | 6/1974 | Hunt ............................ 60/284 |
| 3,816,717 A | 6/1974 | Yoshida et al. |
| 3,949,551 A | 4/1976 | Eichler et al. ................. 60/274 |
| 4,015,566 A | 4/1977 | Wahl |
| 4,110,010 A | 8/1978 | Hilton ......................... 350/292 |
| 4,351,281 A | 9/1982 | Geiger et al. |
| 4,376,428 A | 3/1983 | Hata et al. |
| 4,389,994 A | 6/1983 | Denz et al. |
| 4,433,654 A | 2/1984 | Yokooku |
| 4,587,938 A | 5/1986 | Kobayashi et al. |
| 4,725,955 A | 2/1988 | Kobayashi et al. |
| 4,895,120 A | 1/1990 | Tobinaga et al. |
| 5,050,551 A | 9/1991 | Morikawa .................... 123/305 |
| 5,278,762 A | 1/1994 | Kawamura |
| 5,284,116 A | 2/1994 | Richeson, Jr. |
| 5,293,741 A | 3/1994 | Kashiyama et al. .......... 60/284 |
| 5,303,168 A | 4/1994 | Cullen et al. |
| 5,544,639 A | 8/1996 | Shouda et al. |
| 5,642,705 A | 7/1997 | Morikawa et al. .......... 123/300 |

(Continued)

FOREIGN PATENT DOCUMENTS

| | | | |
|---|---|---|---|
| EP | 0785343 A1 | 1/1997 | |
| JP | 363001749 A | 6/1986 | |
| JP | 62-91662 A | * 4/1987 | ............. F02P/5/15 |

OTHER PUBLICATIONS

Cameron, Kevin, "PipeTemp and Airbox Pumping", *Snow-Tech Magazine*, Winter 2000–2001, snowtechmagazine.com/articles/pipetemp/piptemp.html, pp. 1–9, printed Mar. 25, 2003.
*1999 Artic Cat ZR 440/Z440 Sno Pros(SnowTech Winter 1998–99)* pp. 66–71.

*Primary Examiner*—Hieu T. Vo
(74) *Attorney, Agent, or Firm*—Fredrikson & Byron, P.A.

(57) ABSTRACT

A vehicle with a two-stroke engine includes a system for rapidly heating an exhaust pipe. The system may include a heating mode signal generator, a sensor, and a controller. Activation of the signal generator signals the controller, which, in turn, determines whether the engine RPM falls in a range such that the vehicle remains stationary. The controller may then set the engine ignition timing to a heating mode range that rapidly heats the exhaust pipe system. The ignition timing may be after top dead center in the heating mode. A method of rapidly heating an exhaust pipe is also disclosed.

42 Claims, 8 Drawing Sheets

U.S. PATENT DOCUMENTS

| | | |
|---|---|---|
| 5,655,365 A | 8/1997 | Worth et al. .................. 60/285 |
| 5,664,544 A | 9/1997 | Tomisawa .................. 123/421 |
| 5,738,073 A | 4/1998 | Koike et al. |
| 5,875,763 A | 3/1999 | Mottier et al. |
| 5,946,908 A | 9/1999 | Motoyama et al. |
| 5,950,419 A | 9/1999 | Nishimura et al. ........... 60/274 |
| 5,975,046 A | 11/1999 | Kaneko et al. ............. 123/300 |
| 6,202,406 B1 | 3/2001 | Griffin et al. ................. 60/274 |
| 6,237,327 B1 | 5/2001 | Nishimura et al. ........... 60/276 |
| 6,237,566 B1 * | 5/2001 | Spaulding .............. 123/406.44 |
| 6,266,957 B1 | 7/2001 | Nozawa et al. ............... 60/284 |
| 6,345,499 B1 | 2/2002 | Nishimura et al. ........... 60/277 |
| 6,371,082 B1 * | 4/2002 | Spaulding .............. 123/406.44 |
| 2001/0035008 A1 | 11/2001 | Nozawa et al. ............... 60/284 |
| 2002/0023431 A1 | 2/2002 | Takemura et al. ............ 60/284 |

* cited by examiner

EXHAUST PIPE HEATER

CROSS REFERENCE TO RELATED APPLICATIONS

The present application is a utility patent application having a priority date based from a provisional application filed Oct. 11, 2002 and assigned Ser. No. 60/417,976.

TECHNICAL FIELD

The invention relates to two-stroke engines, such as those used in snowmobiles. In particular, this invention relates to heating two-stroke engine exhaust pipes or exhaust systems to achieve maximum horsepower.

BACKGROUND OF THE INVENTION

It is generally known in the art of vehicular two-stroke engines that to achieve maximum horsepower from an engine, its corresponding exhaust pipe must be at an optimal temperature. Typically, following a cold start-up of a two-stroke engine, the exhaust pipe is at a temperature that is less than optimal. As a consequence, systems have been designed and located in the engine cavities such that the engine ignition timing can be retarded from its normal setting in order to more rapidly heat the exhaust pipe. This is generally done by the systems in order to allow the fuel to burn in the exhaust area for a longer period of time. In doing so, the exhaust pipe temperature is brought up to its optimal point at a much quicker rate than if the timing had not been retarded at all. Once the optimal pipe temperature is reached, the systems generally advance the engine ignition timing back to the engine's normal setting. One disadvantage of the engine ignition timing being retarded by the systems mentioned above is that there are time periods, i.e., the warming periods, during which the engine cannot achieve maximum horsepower even if it is so desired by a rider.

SUMMARY

The invention provides systems and methods for heating an exhaust pipe of a two-stroke engine for a vehicle. An embodiment of one system of the invention provides for rapid heating in the exhaust pipe close to a predetermined target temperature, and comprises a cylinder, a piston, an ignition source, a heating mode signal generator, a sensor, and a controller. The piston is movable in the cylinder, and is adapted to compress a fuel-air mixture to be ignited in the cylinder. Upon the fuel-mixture being ignited, exhaust gas from the ignited fuel-air mixture is expelled from the cylinder into the exhaust pipe. The ignition source is operatively coupled to the cylinder, the heating mode signal generator generates a signal when manually activated, and the sensor detects temperature of the exhaust gas expelled from the cylinder. The controller is operatively coupled to the ignition source, the signal generator, and the sensor. The controller activates the ignition source at a particular point during the compressing movement of the piston to provide an engine ignition timing. The controller sets the engine ignition timing to a maximum retarded setting to rapidly heat the exhaust pipe when the signal generator is activated, when the vehicle is stationary, and when the exhaust gas temperature is less than the target temperature.

An embodiment of another system of the invention provides for maintaining the temperature in an exhaust pipe of a two-stroke vehicle engine close to a target temperature. The system comprises a cylinder, a piston, an ignition source, a heating mode signal generator, an RPM sensor, a temperature sensor, and a controller. The piston is movable in the cylinder, and is adapted to compress a fuel-air mixture to be ignited in the cylinder. Upon the fuel-mixture being ignited, exhaust gas from the ignited fuel-air mixture is expelled from the cylinder into the exhaust pipe. The ignition source is operatively coupled to the cylinder, the heating mode signal generator generates a signal when manually activated, the RPM sensor senses RPM speed of the engine, and the temperature sensor detects temperature of the exhaust gas expelled from the cylinder. The controller is operatively coupled to the ignition source, the signal generator, the RPM sensor, and the temperature sensor. The controller activates the ignition source at a particular point during the compressing movement of the piston to provide an engine ignition timing. The controller also sets the engine ignition timing to a heating mode setting to heat the exhaust pipe near a target temperature stored in the controller. The controller sets the engine ignition timing to the heating mode setting when the signal generator is activated and when the engine RPM is within a particular range of speeds below an RPM value at which a clutch of the vehicle will generally engage such that the vehicle remains stationary.

An embodiment of another system of the invention provides for rapid heating in an exhaust pipe of a two-stroke vehicle engine. The system comprises a cylinder, a piston, an ignition source, a heating mode signal generator, and a controller. The piston is movable in the cylinder, and is adapted to compress a fuel-air mixture to be ignited in the cylinder. Upon the fuel-mixture being ignited, exhaust gas from the ignited fuel-air mixture is expelled from the cylinder. The ignition source is operatively coupled to the cylinder, and the heating mode signal generator generates a signal when manually activated. The controller activates the ignition source at a particular point during the compressing movement of the piston to provide an engine ignition timing. The controller also retards the engine ignition timing to a heating mode setting after top dead center (ATDC) to heat the exhaust pipe near a target temperature. The controller sets the engine ignition timing to the heating mode setting when the signal generator is activated and when the vehicle is stationary.

An embodiment of one method for rapid heating in an exhaust pipe of a running engine for a vehicle includes an engine having a piston movable in the cylinder and adapted to compress a fuel-air mixture being expelled from the cylinder in the exhaust pipe. The method comprises steps of receiving a manually activated heating mode request signal, determining whether an RPM of the engine is within a heating mode RPM range, determining a temperature of exhaust gas being expelled from the engine, comparing the temperature of the exhaust gas to a target temperature, and changing an ignition timing of the engine to a maximum retarded setting to rapidly heat the exhaust pipe when the request signal is received, when the engine's RPM is within the heating mode RPM range, and when the exhaust gas temperature is less than the target temperature.

An embodiment of another system for rapid heating in an exhaust pipe of an engine for a vehicle involves a controller, which comprises a memory and a microprocessor. The memory is utilized for holding programmed parameters and data. The microprocessor is operatively coupled to the memory and adapted to receive the data including a detected temperature of exhaust gas from the engine, engine RPM, and a manually activated heating mode request signal. The microprocessor is programmed to activate an ignition source for the engine according to an engine ignition timing, and to retard the engine ignition timing when the controller receives the heating mode request signal and when the engine RPM is within a particular range.

DETAILED DESCRIPTION OF THE INVENTION

Figure 1:
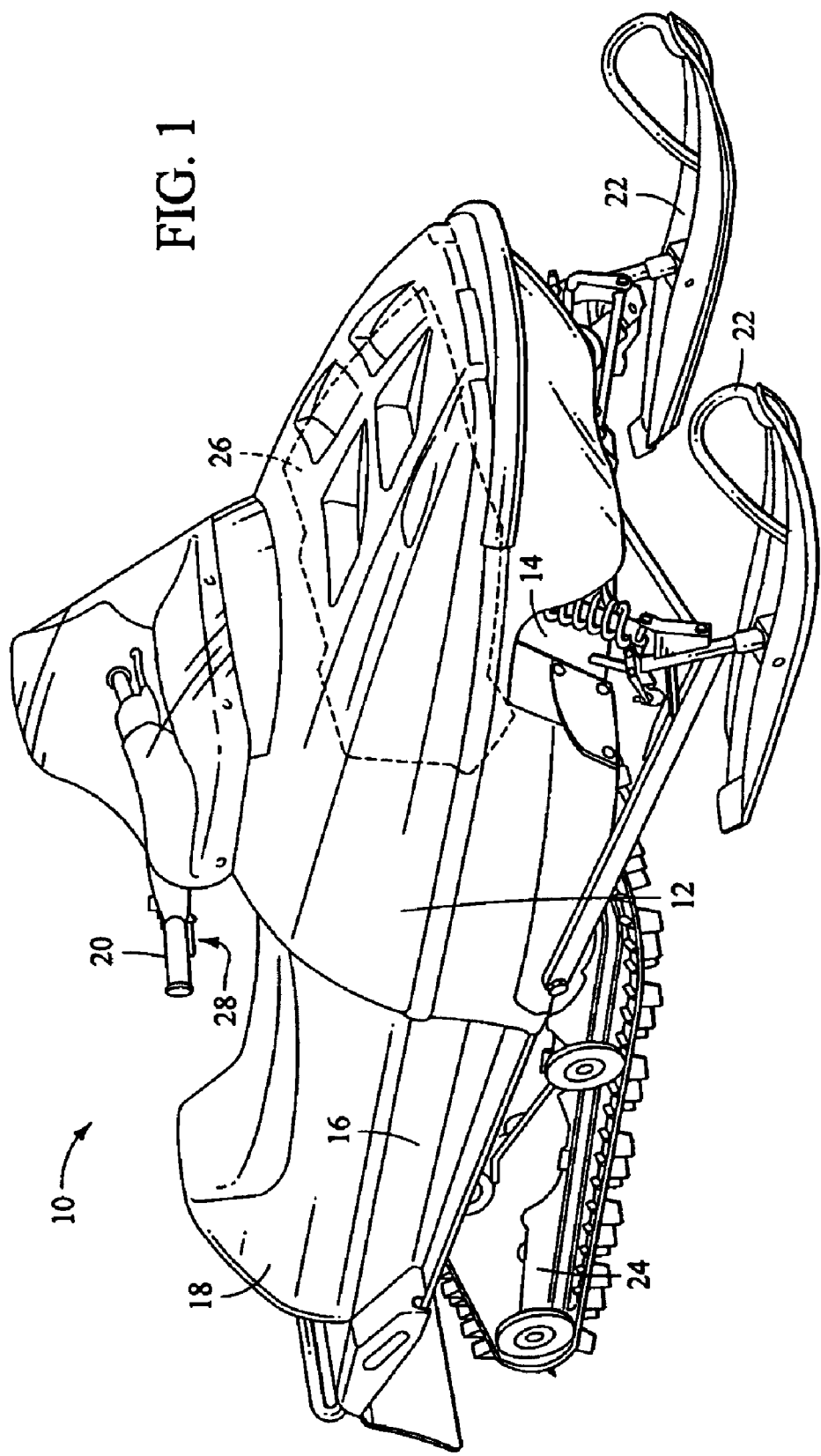
FIG. 1 is a perspective view of a snowmobile constructed in accordance with one embodiment of the invention.

The following detailed description is to be read with reference to the drawings. The drawings, which are not necessarily to scale, depict preferred embodiments of a snowmobile incorporating the system of the invention. It will be understood, however, that many of the specific details of the snowmobile incorporating the system illustrated in the drawings could be changed or modified by one of ordinary skill in the art without departing significantly from the spirit of the invention. The system of the invention is designed and described for use on a snowmobile, but it is contemplated that it may also be used on any other vehicle utilizing a two-stroke or similarly functioning engine as well. The function and operation of two-stroke engines are well known (see e.g., U.S. Pat. No. 5,050,551 to Morikawa) and need not be described in detail.

A snowmobile 10 having a system in accordance with one embodiment of the invention is illustrated in FIG. 1. The snowmobile 10 includes a body assembly 12 made up of a number of parts which may be formed of suitable materials that cover and protect a support frame or chassis 14. The body assembly 12 further includes a rear body portion 16 that accommodates a seat 18 adapted to carry one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14.

Rearwardly of the front skis 22 and beneath the seat 18, the chassis 14 suspends an endless track assembly 24 by a suitable suspension. The endless track 24 is driven by an internal combustion engine indicated generally by reference numeral 26 that is supported by the chassis 14 and located in an engine compartment within the body assembly 12 towards the front of the snowmobile 10. The right handlebar includes a throttle control 28 that controls the RPM of the engine in a known manner.

Figure 2:
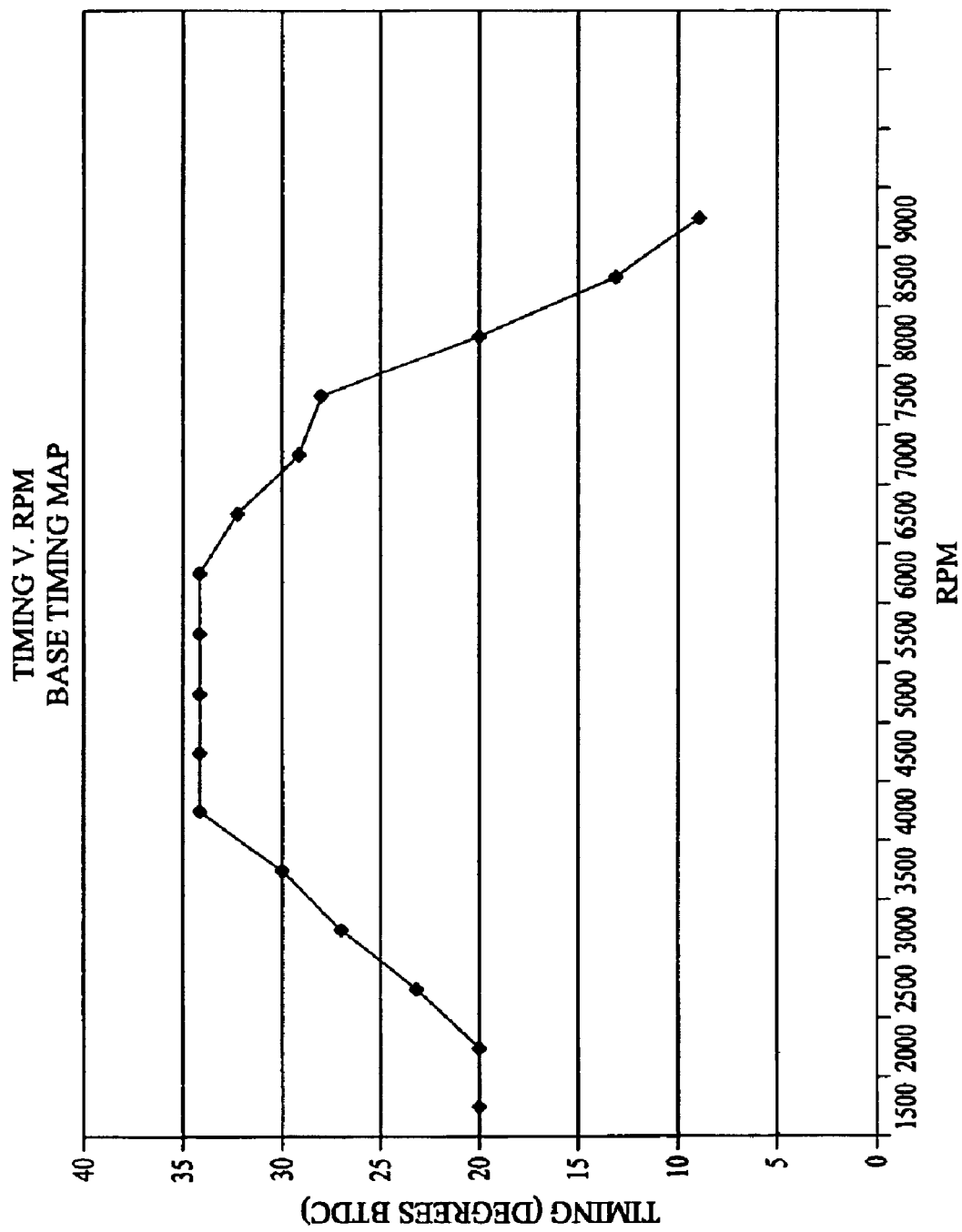
FIG. 2 is a base map graph showing engine ignition timing versus RPM.

FIG. 2 shows a snowmobile base map graph displaying standard two-stroke engine ignition timing versus RPM. As can be seen from the graph, as the engine RPM (on the horizontal x-axis) increases, the engine ignition timing (on the y-axis) correspondingly varies along its base map curve. A base map is generally known in the art as a series of desired ignition points based on changing engine RPM or a graphical representation of the desired fluctuation of engine ignition timing with changing engine RPM. In an alternate embodiment, multiple maps could be stored in memory. The desired base map would then be selected based on an exhaust temperature, a throttle position, or other vehicle parameters, as is known in the art.

Figure 3:
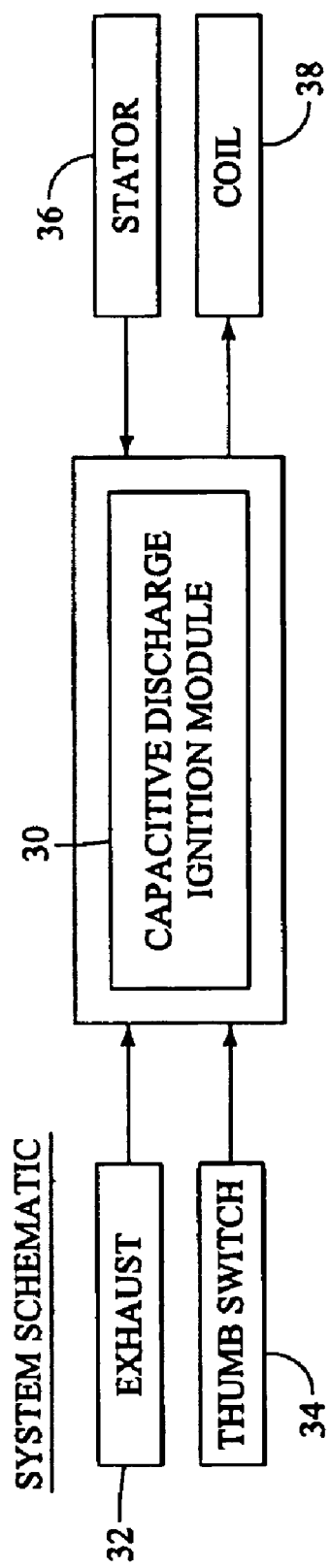
FIG. 3 is a block diagram showing the system schematic of one embodiment of the invention.

A block diagram depicting the system schematic of an embodiment of the invention is shown in FIG. 3. The system components include a capacitive discharge ignition (CDI) module 30, an exhaust temperature probe 32, a thumb switch 34, a stator 36, and a coil 38. The arrows connecting the system components are shown to illustrate the direction of an outgoing signal from each component, as to whether the signals are being sent to the CDI 30, or whether the signals are being sent from the CDI 30. The only component shown that receives a signal from the CDI 30 is the coil 38, whereas the exhaust temperature probe 32, the thumb switch 34, and the stator 36 all send signals to the CDI 30. Of course, other components are connected to the CDI 30 to aid in its function, as is well-known in the art; the components shown in FIG. 3 are merely those relevant to the preferred embodiment. Suitable equivalents may be substituted as well.

Figure 4:
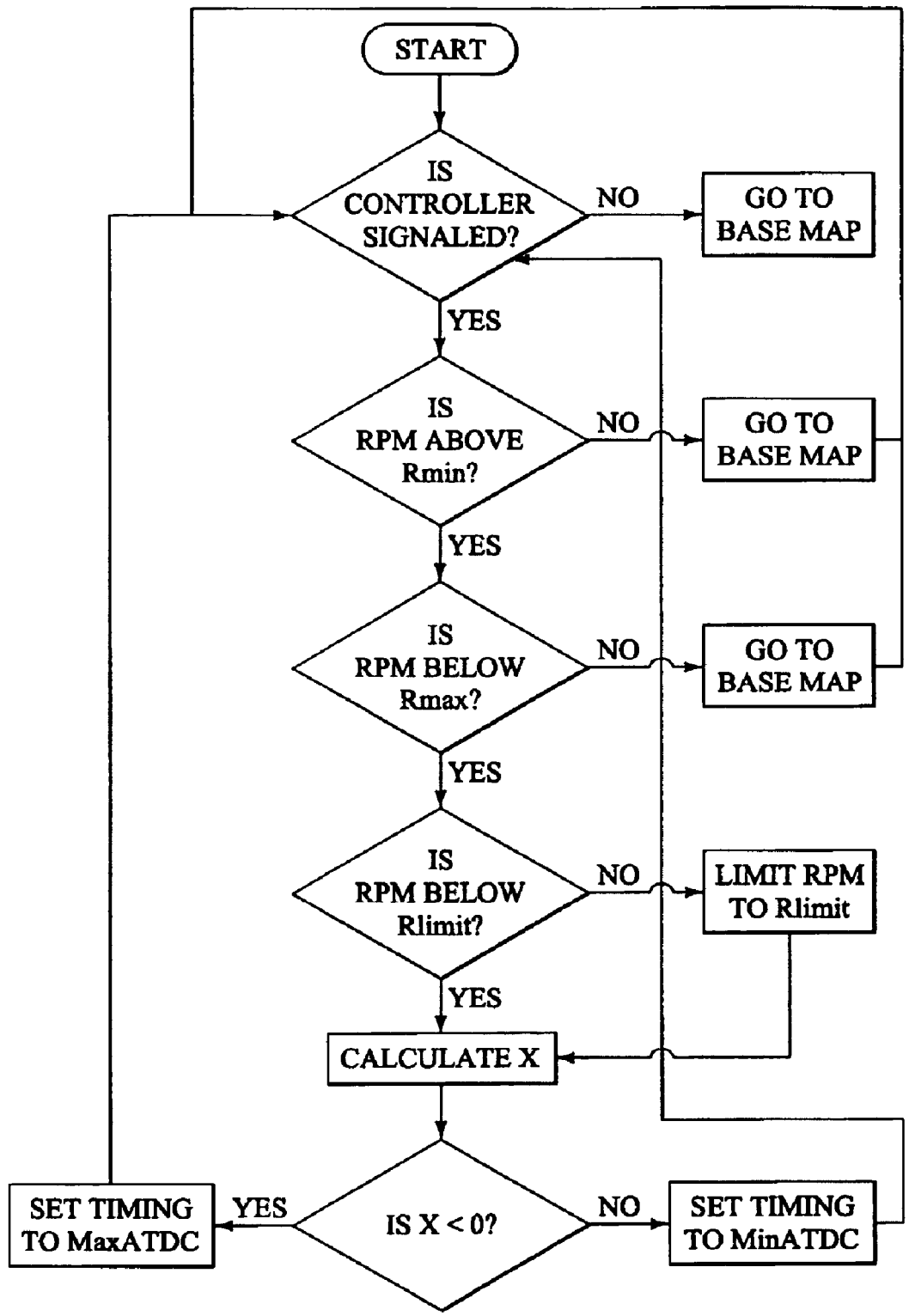
FIG. 4 is a flow chart showing the operations of a CDI of one embodiment of the invention.
Figure 5:
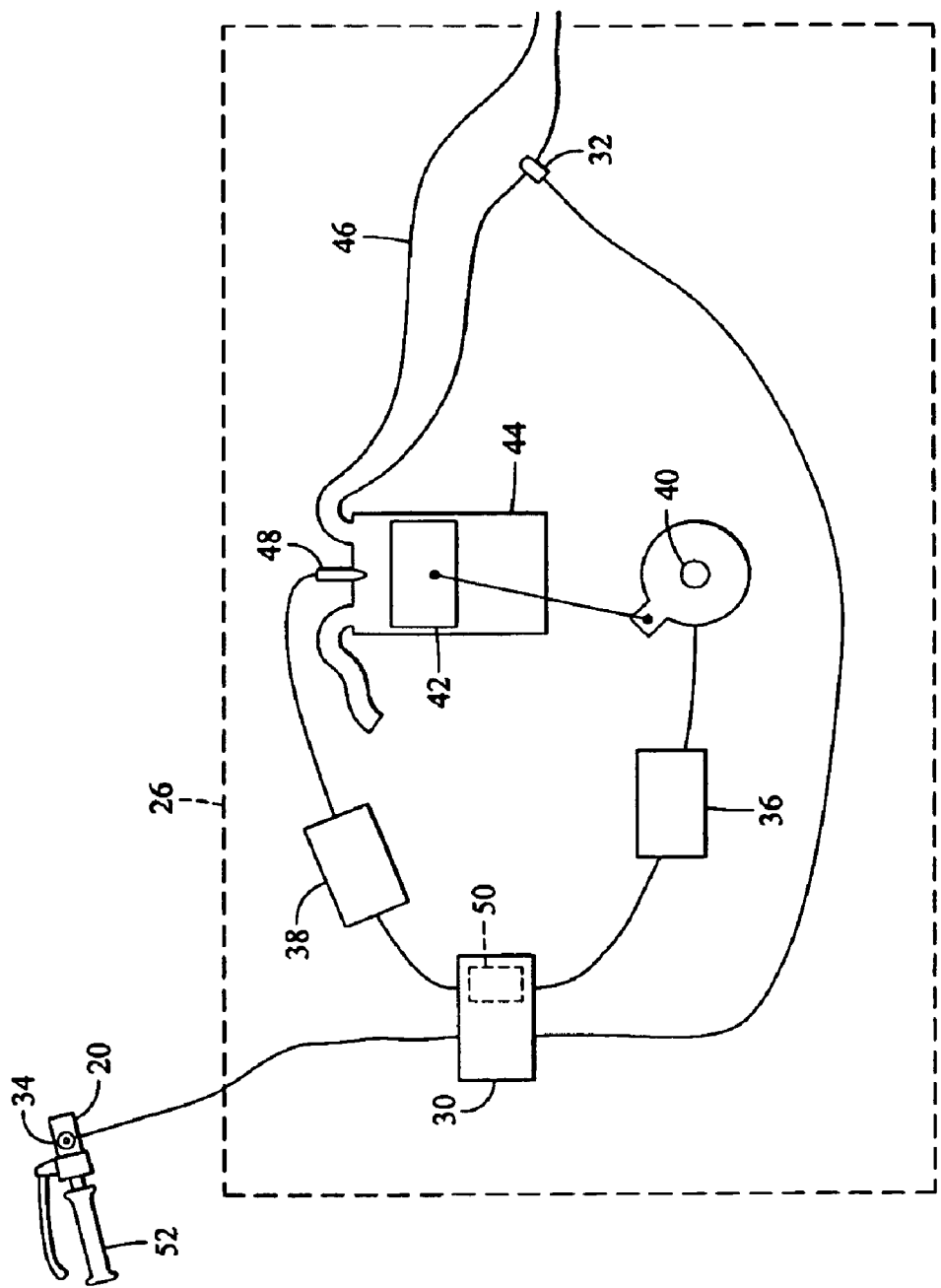
FIG. 5 is a schematic illustration of an exemplary engine having a system in accordance with one embodiment of the invention.

FIG. 4 illustrates a flow chart showing the operations of a preferred embodiment of the invention. While FIG. 4 illustrates a preferred embodiment, it should be recognized that steps in the flow chart could be exchanged or even in some cases eliminated without diverting from the spirit the invention. FIG. 5 shows an exemplary embodiment of the invention in accordance with the flowchart, illustrating each of the system components in regards to their proximity to each other on the vehicle.

As depicted in FIGS. 4 and 5, the exhaust pipe heating system of an embodiment of the invention is initiated through the manual signaling of the controller, CDI 30. As shown in FIG. 5, depressing a thumb switch 34, which is operatively coupled to the CDI 30, facilitates a mode change signal being sent to CDI 30. Thus, with the thumb switch 34 being depressed, an electrical signal is sent from the switch to CDI 30, in order to signal the mode change. Next, the RPM of the engine is determined by CDI 30. The engine RPM is determined with data collected from the stator 36, whereby the frequency of the output pulses of the stator 36 is directly related to the RPM of the engine 26. This is generally shown in FIG. 5 as the stator 36 is located proximate to a crankshaft 40, which is connected to a piston 42 that cycles back and forth in a cylinder 44 of the engine 26. As noted below, other suitable components could be substituted to monitor the engine RPM. Once determined by the CDI 30, the RPM value is checked by the CDI 30 to see if it lies within a "heating mode" RPM range. First, the engine RPM is checked to see if it is above a programmable minimum value, e.g., 4500 rpm. Second, the engine RPM is checked to see if it is below a certain programmable maximum value, e.g., 5100 rpm. If at any time during the period that the CDI 30 is signaled, the RPM of the engine is either determined to not be above the minimum value or not be below the maximum value, i.e., falls out of the "heating mode" RPM range, the engine ignition timing will be reverted by the CDI 30 to a base map curve such as the one illustrated in FIG. 2. Subsequently, as shown in FIG. 4, the process is looped back to the initial step of determining whether the CDI 30 is still signaled or not. However, if the engine RPM lies within this "heating mode" RPM range, the CDI 30 will retard the engine ignition timing to an appropriate value or values, preferably values after top-dead-center (ATDC) in order to heat an exhaust pipe 46 of the vehicle 10. However, timing values before top-dead-center (BTDC) could also be used. The primary components necessary to retard the engine ignition timing are illustrated in FIG. 5, wherein the CDI 30 is electrically connected to, and sends a pulse to, a coil 38, which in turn, generates a voltage to fire a spark plug 48 on top of the cylinder 44. The CDI 30 is able to retard the engine ignition timing by adjusting the firing of the spark plug 48 from its standard base map firing curve, as exemplified in FIG. 2.

As engine ignition timing is retarded to ATDC, as described further below, the engine RPM is checked to see that it is less than the RPM limit value set by the rev limiter 50. The rev limiter 50 is generally located inside the CDI module 30, and thus, is illustrated in FIG. 5 with dashed lines. The programmable RPM limit value of the rev limiter 50 generally falls within the "heating mode" RPM range, usually just below the maximum value of the "heating mode" RPM range, e.g., 5050 rpm. Preferably, the maximum value of the "heating mode" RPM range comprises an RPM value at which a clutch of the vehicle will generally engage. Thus, the rev limiter is set to a value just below the maximum value of the "heating mode" RPM range to ensure that the clutch of the vehicle does not generally engage, and in turn, the snowmobile 10 remains stationary, when the exhaust pipe is being heated. It is contemplated, however, that a brake could also be applied to ensure that the vehicle remains stationary, instead of maintaining the RPM below a certain maximum.

If the engine RPM is not less than the value set by the rev limiter 50 (yet remains within the heating mode range), the CDI 30 lowers the RPM via its rev limiter 50. Keeping the engine in the "heating mode" RPM range is preferable during racing, when the heating mode is preferably engaged prior to a start of a race. In this scenario, a rider may heat an exhaust pipe 46 close to or within a range of its optimal temperature while not causing the snowmobile 10 to move from the starting line.

As the CDI 30 implements the heating mode (retarding the engine ignition timing to ATDC), the exhaust temperature ("$T_P$") is determined. As illustrated in FIG. 5, an exhaust pipe temperature probe 32 is employed to provide temperature readings of the exhaust in the exhaust pipe 46 to the CDI 30. As previously discussed, at programmable time intervals, the sensed exhaust temperature is then compared to a programmable target or optimal exhaust temperature ("$T_O$"), e.g., 400 C, by the CDI 30. However, the sensed exhaust temperature could just as well be compared to multiple programmable target temperatures or a programmed range of target temperatures. In one preferred embodiment, a value X is calculated according to the equation, $X=T_P-T_O$. If the actual exhaust temperature $T_P$ is less than the target exhaust temperature $T_O$, such that $X<0$, then the engine ignition timing is retarded to a programmable maximum engine ignition timing value, e.g., 15° ATDC (−15°) by the CDI 30. If the actual exhaust pipe temperature $T_P$ is greater than or equal to the target exhaust pipe temperature $T_O$, such that $X \geq 0$, then the engine ignition timing is retarded to a programmable minimum engine ignition liming value, e.g., 5° ATDC (−5°) by the CDI 30. From this point, the process is looped back at regular time intervals to check whether the CDI 30 is still signaled, by the depression of the thumb switch 34 as illustrated in FIG. 5 or by any other manual signaling means or mechanism. If at any time the CDI 30 is not signaled, the engine ignition timing will subsequently be reverted by the CDI 30 to a base map curve similar to the one illustrated in FIG. 2. Otherwise, if the CDI 30 is still signaled, the whole process is repeated again, starting with the step of determining the engine RPM and subsequently determining whether the engine RPM still falls within the "heating mode" RPM range. This process keeps repeating for as long as the CDI 30 is signaled and as long as the RPM criteria are met (as further discussed below).

Under an alternate embodiment, the CDI 30, while in heating mode, functions to retard the engine ignition timing to a single value, e.g., 10° ATDC (−10°), without cycling the timing between a maximum or minimum value. This will merely heat the pipe, but the system may not be able to maintain a particular exhaust target temperature.

Figure 6:
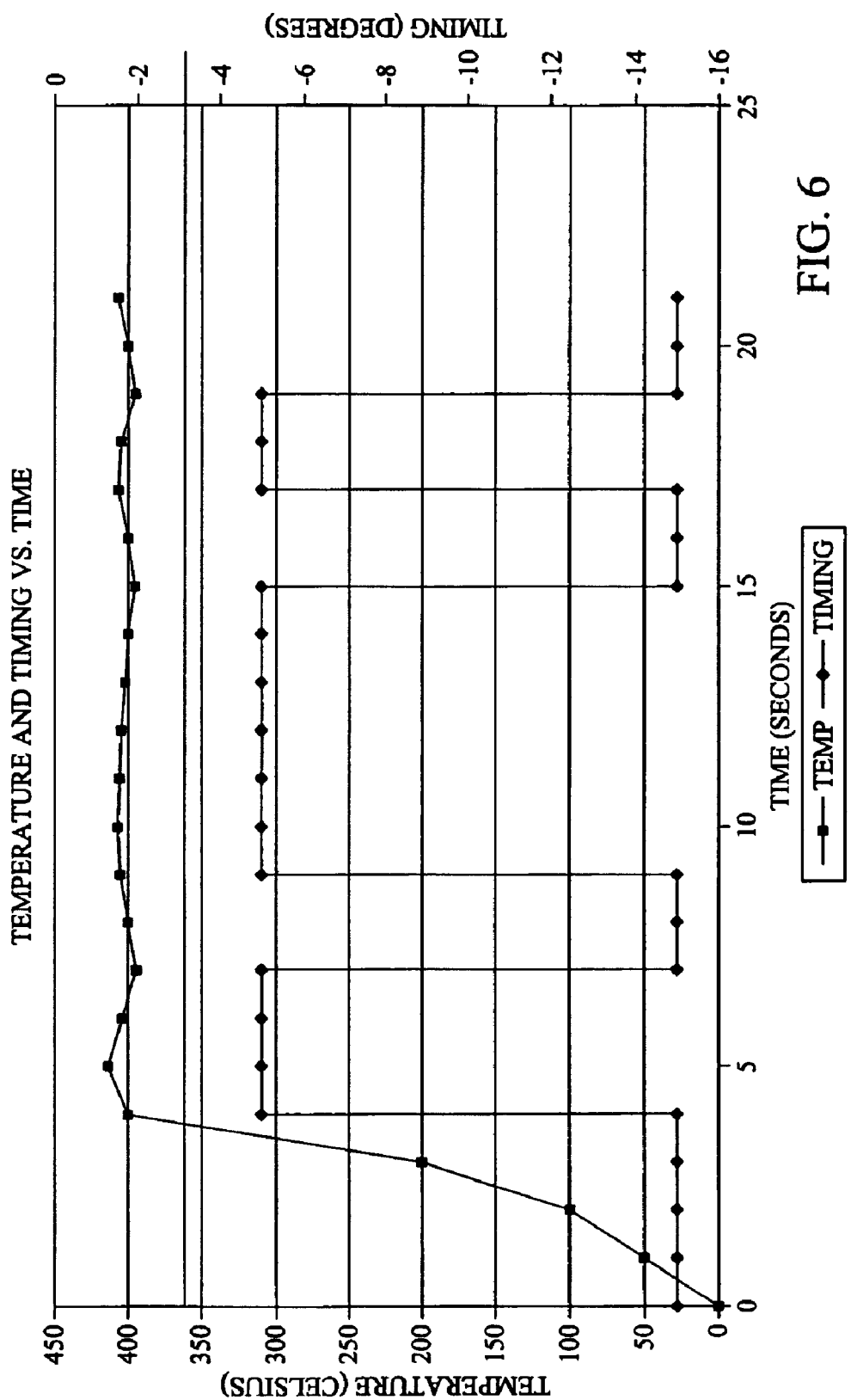
FIG. 6 is a graph showing temperature and engine ignition timing versus time for one embodiment of the invention.
Figure 7:
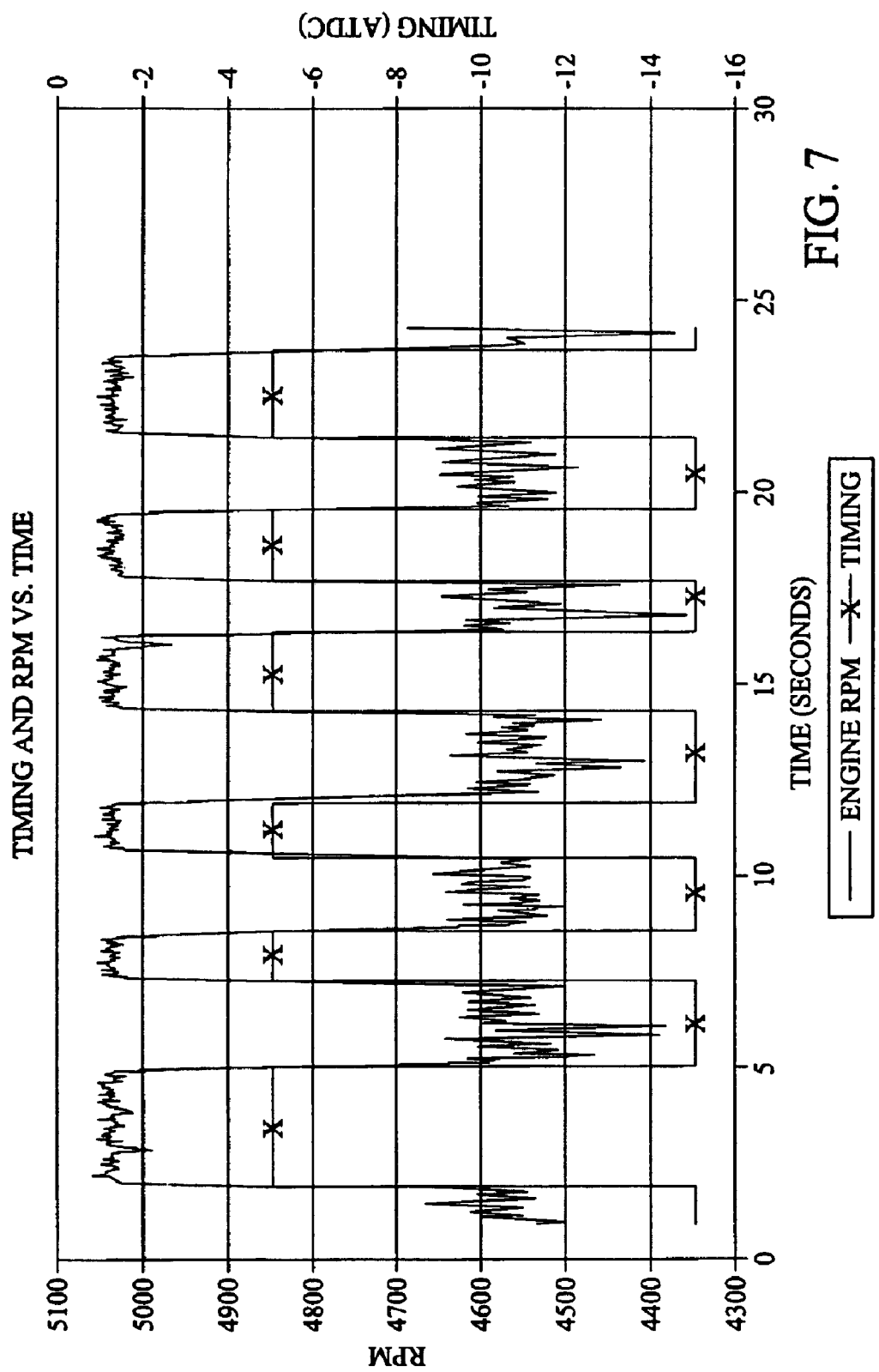
FIG. 7 is a graph showing RPM and engine ignition timing versus time for one embodiment of the invention.
Figure 8:
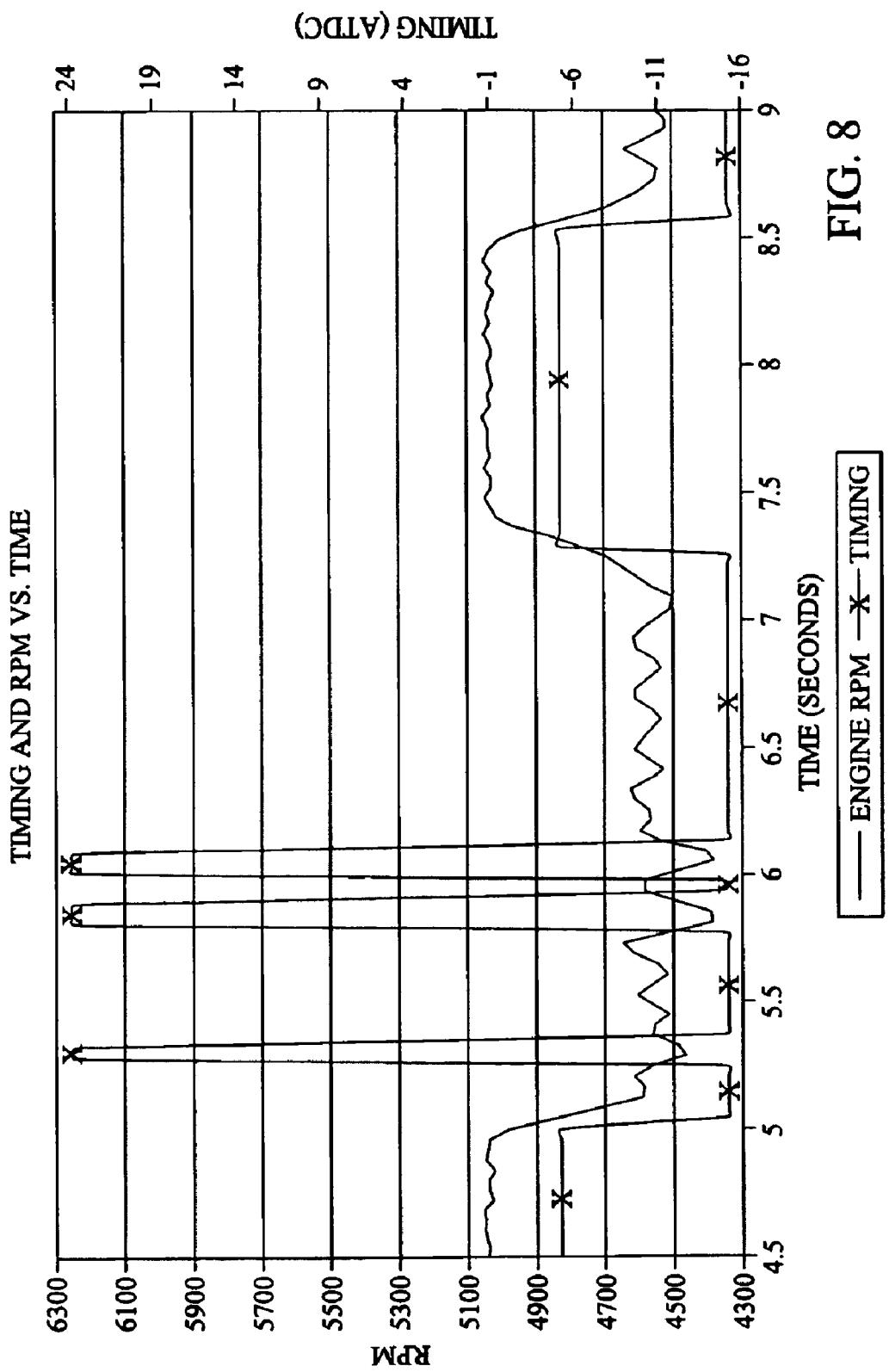
FIG. 8 is a graph showing RPM and engine ignition timing versus time for another embodiment of the invention.

In another embodiment, in heating mode, the CDI 30 modulates the timing similar to the operation illustrated in FIGS. 6 through 8; however, in this embodiment, the timing is not kept constant at either the minimum or maximum values. Instead, the CDI 30 varies the timing about a minimum range (e.g., ATDC) when the exhaust temperature exceeds or is equal to the target temperature. Similarly, in this embodiment, the CDI 30 varies the timing about a maximum range (e.g., ATDC) when the exhaust temperature is less than the target temperature.

In another embodiment, in heating mode, the CDI 30 is programmed to oscillate or ramp the timing between the minimum and maximum values.

The CDI module 30 is known in the art, and one of its primary functions is to act as a capacitor. In doing so, the CDI 30 stores a charge in an internal capacitor, and then subsequently delivers the charge according to an engine ignition timing. The CDI 30 incorporates circuitry utilized to interpret incoming signals and to determine when the charge needs to be released from the CDI 30. This circuitry generally takes the form of a microprocessor. In addition, parameters that the microprocessor is programmed to use in determining whether and to what quantity the engine ignition timing is to be set are held in memory operatively coupled to the microprocessor. The memory storage device also holds much of the data that needs to be used by the microprocessor, e.g., engine RPM and exhaust temperature. As already discussed, also included in the CDI 30 is the rev limiter 50, which functions in keeping the engine RPM below a certain programmed value. In the system, the CDI 30 receives its energy from the stator 36, and the CDI 30 correspondingly sends output pulses to the coil 38. The CDI 30 is preferably located somewhere within the body assembly of the snowmobile 10. A preferred CDI module 30 is manufactured by Kokusan, model no. 4010862, however, it is contemplated that a CDI from another manufacturer may function just as well in the system, and providing the preferred manufacturer and model number herein is not done so as to limit the invention as such.

The thumb switch 34 is also known in the art, and generally functions as a two stage switching device, i.e., either being closed or open. The switch 34 is spring-loaded, and when it is depressed, i.e., closed, CDI 30 is signaled. In contrast, when the switch 34 is not depressed, i.e., open, CDI 30 is not signaled and the regular or standard base map timing system, as illustrated in FIG. 2, is utilized. In a preferred embodiment, the switch 34 is generally located on the handlebars 20, near the hand grips 52, in close proximity to a driver's left thumb. However, it is contemplated that the switch 34 can be located anyplace on the snowmobile 10 that is accessible to the driver. A preferred thumb switch 34 is manufactured by Asahi Denso, model no. 4010311, however, it is further contemplated that a thumb switch from another manufacturer or even another switching device may function just as well in the system, and providing the preferred device, manufacturer, and model number herein is not done so as to limit the invention as such.

It is also contemplated that a request for the heating mode may be signaled to CDI 30 (or other controller) in other manners besides manual engagement of a dedicated switch. Any predetermined type of rider input could be used as a signal for heating mode, such as the following: two taps of the throttle in rapid succession; depression of the throttle for a period of time such that the engine is held in a particular low RPM range or higher than a particular value; applying the brake and throttle simultaneously, turning the handlebars beyond a threshold angle in combination with some other rider action, etc.

The exhaust temperature probe 32 is also known in the art, and functions as, and may comprise, a thermistor, which generates an electrical parameter, generally a voltage, whose magnitude changes with variations in temperature proximate to the thermistor. A preferred exhaust temperature probe 32 is manufactured by NGK, model no. 4010528, however, it is further contemplated that a temperature probe from another manufacturer or even another temperature measuring device may function just as well in the system, and providing the preferred device, manufacturer, and model number herein is not done so as to limit the invention as such.

Probe 32 is connected to CDI module 30 and provides a tool for measuring exhaust temperature in the exhaust pipe region. Generally, it is located at the middle of the exhaust pipe 46 where the diameter is largest. A person skilled in the art would appreciate that instead of measuring the temperature of the exhaust gas, a person could just as well measure the temperature of the exhaust pipe 46. Thus, while a certain embodiment of the invention involves the CDI 30 reacting on data received involving the exhaust temperature in the exhaust pipe, similar data could be gathered and utilized in regards to exhaust pipe temperatures measured in an area proximate to the sensed exhaust just as easily. It is believed that maximum horsepower from the engine may be achieved by heating the exhaust stream or the exhaust pipe to an optimal or target temperature. Therefore, the exhaust gas temperature sensing could take place in the exhaust pipe, on the outside of the pipe, within a double wall of the exhaust pipe, etc., and the system could be adjusted to respond accordingly. Similarly, the exhaust pipe temperature could be sensed based on temperature sensing in the exhaust pipe, on the outside of the pipe, within a double wall of the exhaust pipe, etc. One objective of the preferred embodiment of the invention and temperature sensing involves taking measurements in an area that is not too far enough away from the engine cylinder (so that the exhaust temperatures sensed are fairly steady), yet still close enough to the engine cylinder (so that the system still responds in a timely fashion to the engine). This objective is met based on sensing the gas temperature directly or indirectly (via the exhaust pipe).

The stator 36 is also known in the art, and has at least two functions in the system. It provides power to the CDI module 30, and provides data for the CDI 30 to calculate the engine RPM, as previously discussed. As also mentioned previously, other devices may be used to sense engine RPM. The stator 36 is preferably located within close proximity of the CDI module 30. In addition, the coil 38 is known in the art, and its function is generally to accept the energy pulse from the CDI 30 and deliver that energy at a high voltage level to the spark plug 46. The coil 38 is preferably located within close proximity of the CDI module 30 as well.

FIG. 6 shows a graph displaying temperature and engine ignition timing (y-axis) versus time (x-axis) for a preferred embodiment of the invention. As can be gathered from the graph, the engine is in the "heating mode", i.e., the CDI 30 is signaled and the engine is in the "heating mode" RPM range, since the engine ignition timing is shown in an "ATDC heating range", e.g., in this case, −15° to −5°. Initially, on the graph, it can be observed that the exhaust temperature was well below the target temperature, e.g., in this case, 400° C. Thus, this caused the engine ignition timing to be retarded to the maximum ATDC engine ignition timing value, e.g., in this case, −15°. By retarding the engine ignition timing to this extreme, one can see, in turn, that the exhaust temperature increases rapidly to the target temperature ($T_0$). Once this temperature equals or exceeds the target temperature, the engine ignition timing is advanced to the minimum ATDC engine ignition timing value, e.g., in this case, −5°. As long as the exhaust temperature is at least 400° C., the engine ignition timing is maintained at −5°. However, when the exhaust temperature falls below the target temperature, the engine ignition timing retards again to the maximum ATDC engine ignition timing value of −15° to raise the target temperature again at least equal to or exceeding the target temperature of 400° C. This process of maintaining the exhaust at the target temperature continues until the CDI 30 is not signaled, or until the engine RPM falls outside the "heating mode" RPM range. Once either of these two events takes place, the engine ignition timing will subsequently be reverted to a base map curve similar to the one illustrated in FIG. 2.

FIG. 7 shows a graph displaying RPM and engine ignition timing (y-axis) versus time (x-axis) for a preferred embodiment of the invention. As can be gathered from the graph, the engine is again in the "heating mode", i.e., the CDI 30 is signaled and the engine is in the "heating mode" RPM range, since the engine ignition timing is shown in an "ATDC heating range",e.g., in this case, −15° to −5. Similar to FIG. 6, it can be observed that the engine ignition timing is cycling between the maximum ATDC engine ignition timing value (i.e., −15°) and the minimum ATDC engine ignition timing value (i.e., −5°). In reference to FIG. 6, it may be concluded that the engine ignition timing is being cycled in this fashion to keep the exhaust pipe temperature at its target temperature ($T_0$). Looking at RPM on the y-axis in FIG. 7, it may be further concluded that the RPM increases every time the engine ignition timing is advanced to −5° from −15° and that the RPM decreases every time the engine ignition timing is retarded from −5° to −15°. When the engine ignition timing is retarded, the RPM decreases because the combustion process is less efficient, as fuel may be burning in the exhaust pipe instead of within the cylinder. This causes a rise in the exhaust pipe temperature, but a reduction in the engine RPM because of its inefficiency.

Referencing FIG. 7, one can also observe that the engine RPM remains within the "heating mode" RPM range, which illustrates a feature of an embodiment of the invention. In initially depressing the thumb switch, one may be signaling the CDI module in preparation for "heating mode." However, this mode cannot be achieved if the driver does not subsequently depress the throttle as well. This action by the driver will cause the engine RPM to increase to the point that it is in the "heating mode" RPM range. However, because of the rev limiter located in the CDI, the engine RPM should not reach a high enough value where it goes above and out of the "heating mode" RPM range. Thus, the engine RPM will be maintained at least below the programmed rev limiter value. As previously mentioned, this value is usually programmed to be a little lower than the maximum value of the "heating mode" RPM range. In FIG. 7, the programmed rev limiter value generally appears to be 5050 rpm. Referencing the flowchart of FIG. 4, if at any time the driver lets off on the throttle to the point where the engine RPM drops below the minimum value and out of the "heating mode" RPM range, the engine ignition timing will be subsequently reverted to a base map curve similar to the one illustrated in FIG. 2.

In addition, if the RPM drops below the heating mode's RPM minimum as a response to the engine ignition timing being retarded to −15°, the timing will also generally revert to a base map curve similar to the one illustrated in FIG. 2. In FIG. 7, the RPM can be seen to drop below the RPM minimum for brief periods of time. The CDI may be programmed to ignore temporary drops such as shown in FIG. 7 (i.e., remaining in heating mode). In contrast, the CDI may be programmed to react and advance the retarded engine ignition timing to base map timing for temporary RPM dips such as shown in FIG. 8. As can be seen from FIG. 8, during the time interval generally between 5 and 7.25 seconds (x-axis), as the engine ignition timing is retarded to 15° ATDC (−15°), the RPM curve is shown to drop below the RPM minimum of 4500 at three different times. The times that the RPM drops below the minimum generally occur at 5.25 seconds, 5.75 seconds and 6 seconds. Every time the RPM drops during this time interval, one can see the response of the CDI 30. The CDI 30 advances the engine ignition timing back to an engine ignition timing base map curve similar to the one illustrated in FIG. 2. As can be seen from FIG. 8, the engine ignition timing is generally advanced to about 24° BTDC (24°). Subsequently, as the RPM increases to or above the RPM minimum of 4500 (as a response to the advanced engine ignition timing), as long as the CDI 30 is still signaled, the CDI 30 retards the engine ignition timing back to the heating range so that once again, the engine ignition timing cycles between the maximum ATDC engine ignition timing value (i.e., −15°) and the minimum ATDC engine ignition timing value (i.e., −5°). Conversely, if the rev limiter malfunctions and the engine RPM exceeds the maximum value and falls out of the "heating mode" RPM range, the CDI will subsequently revert the engine ignition timing to an engine ignition timing base map curve similar to the one illustrated in FIG. 2.

While a preferred embodiment of the present invention has been described, it should be understood that various changes, adaptations, and modifications may be made therein without departing from the spirit of the invention and the scope of the appended claims.

What is claimed is:

1. A system for rapidly heating the temperature in an exhaust pipe of a two-stroke vehicle engine close to a predetermined target temperature, comprising:
   a cylinder;
   a piston movable in the cylinder a nd adapted to compress a fuel-air mixture to be ignited in the cylinder with exhaust gas from ignition of the fuel-air mixture being expelled from the cylinder into the exhaust pipe;
   an ignition source operatively coupled to the cylinder;
   a heating mode signal generator that generates a signal when manually activated;
   a sensor detecting a temperature of the exhaust gas expelled from the cylinder; and
   a controller operatively coupled to the ignition source, the signal generator, and the temperature sensor, the controller activating the ignition source at a particular point during the compressing movement of the piston to provide an ignition timing, and the controller setting the engine ignition timing to a maximum retarded setting to rapidly increase the exhaust gas temperature when the generator is activated, when the vehicle is stationary, and when the sensed exhaust gas temperature is less than the target temperature.

2. The system of claim 1, wherein the controller changes the engine ignition timing to a setting less than the maximum retarded setting to allow the exhaust gas temperature to cool when the generator is activated, when the vehicle is stationary, and when the sensed exhaust gas temperature exceeds the target temperature.

3. The system of claim 2, wherein the maximum retarded setting is a constant.

4. The system of claim 2, wherein the controller switches between the maximum retarded setting and the setting less than the maximum retarded setting to the exhaust gas temperature close to the predetermined temperature.

5. The system of claim 4, wherein the maximum retarded setting is 15 degrees after top dead center and the setting less than the maximum retarded setting is 5 degrees after top dead center.

6. The system of claim 1, wherein the heating mode signal generator includes a manually operated switch that generates a signal when manually activated.

7. The system of claim 6, wherein the manually operated switch is mounted on a handlebar of the vehicle.

8. The system of claim 1, wherein the maximum retarded setting of the engine ignition timing is after top dead center (ATDC).

9. The system of claim 1, wherein the vehicle is stationary when engine RPM is within a particular range of speeds below an RPM value at which a clutch of the vehicle will generally engage.

10. The system of claim 1, wherein the controller is a capacitive discharge ignition system.

11. The system of claim 1, wherein the engine powers a snowmobile.

12. The system of claim 1, wherein the sensor contacts the exhaust gas.

13. The system of claim 1, wherein the sensor is disposed on the exhaust pipe.

14. A system for maintaining the temperature in an exhaust pipe of a two-stroke vehicle engine close to a target temperature, comprising:
   a cylinder;
   a piston movable in the cylinder and adapted to compress a fuel-air mixture to be ignited in the cylinder with exhaust gas from ignition of the fuel-air mixture being expelled from the cylinder into the exhaust pipe;
   an ignition source operatively coupled to the cylinder;
   a heating mode signal generator that generates a signal when manually activated;
   an RPM sensor for sensing RPM speed of the engine;
   a temperature sensor detecting a temperature of the exhaust gas expelled from the cylinder; and
   a controller operatively coupled to the ignition source, the signal generator, the RPM sensor, and the temperature sensor, the controller activating the ignition source at a particular point during the compressing movement of the piston to provide an ignition timing, the controller setting the engine ignition timing to a heating mode setting to heat the exhaust gas near a target temperature stored in the controller when the generator is activated and when the engine RPM is within a particular range of speeds below an RPM value at which a clutch of the vehicle will generally engage such that the vehicle remains stationary.

15. The system of claim 14, wherein the heating mode setting includes a maximum retarded setting after top dead center selected by the controller when the sensed exhaust gas temperature is less than the target temperature to heat the exhaust gas towards the target temperature.

16. The system of claim 15, wherein the heating mode setting includes a setting less than the maximum retarded setting selected by the controller when the sensed exhaust gas temperature exceeds the target temperature to allow the exhaust gas to cool towards the target temperature.

17. The system of claim 14, wherein the controller includes a rev limiter adapted to keep the engine RPM from exceeding the particular range of speeds at which the clutch of the vehicle will generally engage.

18. The system of claim 14, wherein the heating mode signal generator includes a manually operated switch that generates a signal when manually activated.

19. The system of claim 18, wherein the manually operated switch is mounted on a handlebar of the vehicle.

20. The system of claim 14, wherein the engine RPM must be above a minimum threshold before the controller will set the engine ignition timing to the heating mode.

21. The system of clam 14, wherein the heating mode setting includes timing settings after top dead center.

22. The system of claim 14, wherein the engine powers a snowmobile.

23. The system of claim 14, wherein the sensor contacts the exhaust gas.

24. The engine of claim 14, wherein the sensor is disposed on the exhaust pipe.

25. The engine of claim 24, wherein the sensed exhaust gas temperature is the exhaust pipe temperature.

26. A system for providing rapid heating in an exhaust pipe of an engine for a vehicle comprising:
   a cylinder;
   a piston movable in the cylinder and adapted to compress a fuel-air mixture to be ignited in the cylinder with exhaust gas from ignition of the fuel-air mixture being expelled from the cylinder into the exhaust pipe;
   an ignition source operatively coupled to the cylinder;
   a heating mode signal generator that generates a signal when manually activated; and
   a controller operatively coupled to the ignition source and the signal generator, the controller activating the ignition source at a particular point during the compressing movement of the piston to provide an ignition timing, the controller retarding the engine ignition timing to a heating mode setting after top dead center (ATDC) to heat the exhaust gas when the generator is activated and when the vehicle is stationary.

27. The system of claim 26, further including an RPM sensor operatively coupled to the controller, and wherein the vehicle is stationary when engine RPM is within a particular range of speeds below an RPM value at which a clutch of the vehicle will generally engage.

28. The system of claim 26, wherein the heating mode signal generator includes a manually operated switch that generates the signal when manually activated.

29. The system of claim 28, wherein the manually operated switch is mounted on a handlebar of the vehicle.

30. The system of claim 26, wherein the controller disengages the heating mode setting when the heating mode signal generator is not manually activated.

31. The system of claim 30, wherein the controller reverts to a base ignition timing before top dead center when it disengages the heating mode setting.

32. The system of claim 26, wherein the controller disengages the heating mode setting and reverts to a base ignition timing before top dead center when the vehicle is not stationary.

33. The system of claim 26, wherein controller sets the timing to heat the exhaust gas near a target temperature.

34. A controller for rapidly heating an exhaust pipe of an engine for a vehicle comprising:
   a memory utilized for holding programmed parameters and data; and
   a microprocessor operatively coupled to the memory, the microprocessor adapted to receive the data including a detected temperature of the exhaust pipe, engine RPM, and a manually activated heating mode request signal, the microprocessor programmed to activate an ignition source for the engine according to an engine ignition timing, and the microprocessor programmed to retard the engine ignition timing when the controller receives the heating mode request signal and when the engine RPM is within a predetermined range.

35. The controller of claim 34, further comprising a housing that contains the microprocessor and the memory, the housing providing a protective framework for the microprocessor that includes a plurality of ports operatively coupled to the microprocessor for transmission of signals to the microprocessor from the engine and from the microprocessor to the engine.

36. The controller of claim 34, wherein the microprocessor is programmed to retard the ignition timing to a particular range of timing values when the controller receives the heating mode request signal and when the engine RPM is within a predetermined range.

37. A method for providing rapid heating in an exhaust pipe of a running engine for a vehicle, the engine having a piston movable in the cylinder and adapted to compress a fuel-air mixture being expelled from the cylinder in the exhaust pipe, the method comprising:
   (a) receiving a manually activated heating mode request signal;
   (b) determining whether an RPM of the engine is within a heating mode RPM range;
   (c) sensing a temperature of exhaust gas being expelled from the engine;
   (d) comparing the temperature of the exhaust gas to a target temperature; and
   (e) changing an ignition timing of the engine to a maximum retarded setting to rapidly heat the exhaust gas when the request signal is received, when the engine's RPM is within the heating mode RPM range, and when the sensed exhaust gas temperature is less than the target temperature.

38. The method of claim 37, wherein the heating mode RPM range is a particular range of speeds below an RPM value at which a clutch of the vehicle will generally engage such that the vehicle remains stationary.

39. The method of claim 37, further including changing the ignition timing to a setting less than the maximum retarded setting to allow the exhaust gas to cool when the request signal is received, when the engine's RPM is within the heating mode RPM range, and when the exhaust gas temperature exceeds the target temperature.

40. The method of claim 37, wherein the maximum retarded setting is after top dead center.

41. The method of claim 37, wherein the heating mode request signal is generated by a manually operated switch.

42. The method of claim 41, wherein the manually operated switch is mounted on a handlebar of the vehicle.

* * * * *